United States Patent
Luebbering et al.

(10) Patent No.: US 9,393,746 B2
(45) Date of Patent: Jul. 19, 2016

(54) METHOD AND A DEVICE FOR THE PREPARATION OF A DRY TEXTILE PREFORM

(75) Inventors: Christian Luebbering, Gruenendeich (DE); Hauke Lengsfeld, Helmste (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 456 days.

(21) Appl. No.: 13/823,496

(22) PCT Filed: Sep. 15, 2011

(86) PCT No.: PCT/EP2011/066019
§ 371 (c)(1),
(2), (4) Date: Mar. 14, 2013

(87) PCT Pub. No.: WO2012/035105
PCT Pub. Date: Mar. 22, 2012

(65) Prior Publication Data
US 2013/0175723 A1    Jul. 11, 2013

Related U.S. Application Data

(60) Provisional application No. 61/383,747, filed on Sep. 17, 2010.

(30) Foreign Application Priority Data

Sep. 17, 2010 (DE) .......................... 10 2010 040 970

(51) Int. Cl.
*B29C 70/56* (2006.01)
*B29B 11/16* (2006.01)
(Continued)

(52) U.S. Cl.
CPC ................. *B29C 70/56* (2013.01); *B29B 11/16* (2013.01); *B29C 51/16* (2013.01); *B29C 51/262* (2013.01); *B29C 70/02* (2013.01); *B29C 70/443* (2013.01)

(58) Field of Classification Search
CPC ...... B29C 70/02; B29C 70/56; B29C 70/443; B29C 51/262
See application file for complete search history.

(56) References Cited

U.S. PATENT DOCUMENTS 2,417,586 A * 3/1947 Crosley .......................... 156/163
3,795,559 A * 3/1974 Horn .............................. 156/152

(Continued)

FOREIGN PATENT DOCUMENTS

CN          101695872       4/2010
DE          102006021110    11/2007

(Continued)

OTHER PUBLICATIONS

German Office Action , Jun. 6, 2011.

*Primary Examiner* — Matthew Daniels
(74) *Attorney, Agent, or Firm* — Greer, Burns & Crain, Ltd.

(57) ABSTRACT

A method for the preparation of a dry textile preform for a large surface area fiber-reinforced composite component, in which resin-free textile material layers for purposes of manufacturing the preform are tensioned in each case in a tensioning frame, and in the stretched state are laid down on a moulding body by means of a linear relative movement between the tensioning frame and the moulding body. Also disclosed is a device for the execution of a method of this type with a tensioning frame for purposes of tensioning the material layers, and with a clamping unit for purposes of fixing the laid-down material layers on a moulding body.

8 Claims, 7 Drawing Sheets

(51) Int. Cl.
*B29C 51/16* (2006.01)
*B29C 51/26* (2006.01)
*B29C 70/44* (2006.01)
*B29C 70/02* (2006.01)

(56) References Cited

U.S. PATENT DOCUMENTS

| | | | | |
|---|---|---|---|---|
| 3,810,805 | A | * | 5/1974 | Goldsworthy ............... 156/361 |
| 5,034,181 | A | * | 7/1991 | Billiu ........................... 264/517 |
| 5,207,963 | A | * | 5/1993 | Grace .......................... 264/163 |
| 2004/0046291 | A1 | * | 3/2004 | Johnson et al. ............... 264/510 |

| | | |
|---|---|---|
| 2004/0074587 | A1 | 4/2004 Koerwien et al. |
| 2007/0035064 | A1 | 2/2007 Coffield |
| 2007/0141334 | A1 | 6/2007 Kulesha |
| 2009/0126060 | A1 | 5/2009 Jacobs et al. |
| 2010/0006202 | A1 | 1/2010 Schendel et al. |
| 2010/0263789 | A1 | 10/2010 Graeber |

FOREIGN PATENT DOCUMENTS

| | | |
|---|---|---|
| DE | 102007058727 | 6/2009 |
| DE | 102009041177 | 3/2011 |
| WO | 0242044 | 5/2002 |

\* cited by examiner

METHOD AND A DEVICE FOR THE PREPARATION OF A DRY TEXTILE PREFORM

CROSS-REFERENCES TO RELATED APPLICATIONS

This application claims the benefit of U.S. Provisional application 61/383,747 filed Sep. 17, 2010 and German patent application No. 10 2010 040 970.7 filed Sep. 17, 2010 the entire disclosures of which are incorporated herein by way of reference.

BACKGROUND OF THE INVENTION

The invention concerns a method for the preparation of a dry textile preform for a large surface area component, in particular with a spherically curved surface, and a device for the execution of such a method.

A method and a device for the preparation of a dry textile preform for a spherically shaped component are, for example, shown in the patent application DE 10 2006 021 110 A1 of the applicant. Dry, i.e. resin-free carbon fibre entities are stored in the rolled-up state on each of two reels. For the laying down of the fibre entities onto a moulding body the rolled-up fibre entities are individually positioned over the moulding body and lowered, wherein during the lowering they are unrolled by means of opposing movements of the reels in horizontal directions. After the laying down of a fibre entity the moulding body is rotated about its vertical axis through a certain angle and a further fibre entity is laid down on the moulding body, or onto the preceding fibre entity. This method is repeated until the preform has a certain number of fibre entities and thus a certain number of layers. The preform is then fed through to a resin infiltration process and an autoclave process for purposes of curing.

By virtue of the automated laying down of the fibre entities labour-intensive manual procedures for draping the fibre entities on the moulding body are dispensed with in this method. However, the preparation of the fibre entities on each of the two reels is relatively labour-intensive, since the fibre entities must be rolled up and unrolled under a constant tension in order to prevent folds, creases and similar in the fibre entities, the removal of which would require manual corrective measures. The formation of folds, creases and similar during the rolling up procedure can be reduced, amongst other measures, by ensuring that the fibre entities have a constant length over their whole cross-section, since then the fibre entities can be laid down on the rollers with step-free leading and trailing edges. However, depending on the cross-sectional shape of the component that is to be produced, the fibre entities often have sections of different lengths for purposes of minimising the material waste. For example, fibre entities for a round component cross-section often have side sections that are shortened relative to a central section, so that a step-shaped leading and trailing edge is formed. For purposes of equalising the section lengths the side sections are then lengthened to the length of the central section by means of textile pieces that are fastened on, for example, glass fibre mats, which after the laying down on the moulding body are then removed once again. The fastening on of the textile pieces is, however, in particular very time-intensive. Moreover the reels are very heavy, and for purposes of driving and manipulation thus require correspondingly high-power drives and heavy-duty bearings.

SUMMARY OF THE INVENTION

The object of the present invention is to create a method for the preparation of a dry textile preform for a large surface area component, in particular with a spherically curved surface, that eliminates the above-cited disadvantages and features simplified manipulation of the at least one fibre entity, and also a device for the execution of such a method.

In an inventive method for the preparation of a dry textile preform for a large surface area component, in particular with a spherically curved surface, at least one dry fibre entity is firstly prepared. A moulding body, onto which the fibre entity is to be laid down, is also prepared. The at least one fibre entity is tensioned in a tensioning frame with a defined tensile force and positioned relative to the moulding body. The fibre entity is then laid down on the moulding body and fixed to the moulding body. After the fixing further fibre entities are in each case positioned onto the fibre entity previously laid down until all the fibre entities have been laid down on the moulding body, wherein before the laying down of each of the fibre entities the moulding body, populated with the laid-down fibre entities, is rotated relative to the tensioning frame.

One advantage of the inventive solution consists in the fact that the fibre entities no longer have to be rolled up and unrolled for purposes of preparation and positioning and thus any introduction of creases, folds and/or undulations during their preparation is prevented. The tensioning frame allows the accommodation of fibre entities with sections of different lengths and/or step-shaped outer edges, since differences in length can be compensated. A lengthening of the shortened fibre entity sections for the formation of step-free outer edges is not necessary. Moreover the tensioning frame defines a tensioning plane for the tensioning of the fibre entity, so that any torsional movement or rotation of the fibre entity is prevented. In addition, during the laying down of the fibre entity on the moulding body just a movement towards the moulding body, but not in the transverse direction, is necessary to unroll the fibre entities, as a result of which the laying down procedure is simplified in terms of the control engineering and is insensitive to disturbances compared with the method of known art, which fact leads to a high process reliability. The fibre entities can be evenly laid down on the moulding body or on one another with a high level of reproducibility, so that the product quality of the preforms is improved. Furthermore transport is improved by means of the tensioning frame, since the fibre entities are held in the tensioning frame under tension and in this manner any vibrations occurring during transport, for example, are compensated for and are not introduced into the fibres.

In a preferred example of embodiment the fibre entities are fixed to the moulding body by means of a clamping device with a clamping force corresponding to the respective tensile force of the tensioning frame. By this means the introduction of stresses and displacements of individual fibres into the fibre entities during the fixing of the respective fibre entity is prevented; this would otherwise require time-intensive and manual draping of the fibre entities. The clamping force can, however, also vary individually, so that fibre displacements and other unevennesses in the material can be removed by means of particular clamping force adjustments.

The clamping device is preferably used to clamp all the fibre entities, wherein it is opened to allow the clamping of each successive fibre entity, and after the laying down of the successive fibre entity is closed for purposes of the common clamping of the fibre entities. By this means the fibre entities previously laid down are compacted by the successive fibre entities on or to the moulding body, and thus any formation of voids between adjacent fibre entities is prevented.

In order to keep any preparatory measures for resin infiltration to a low level, before the laying down of the at least one fibre entity a vacuum foil can be laid down on the moulding body; this acts as a vacuum foil during the resin infiltration of the preform.

The preparatory measures for resin infiltration can be further reduced if at least one vacuum connecting pipe and at least one resin connecting pipe are integrated into the vacuum foil on the moulding body.

In terms of production engineering and ergonomics it is advantageous if the respective fibre entity is lowered onto the moulding body and likewise the preform is positioned in a counter-mould of the moulding body by means of a lowering movement. This is achieved in one example of embodiment, in that the moulding body that is populated with the preform is pivoted about a horizontal axis, and then laid down in the counter-mould by means of a lowering movement. Then by the release of the preform from the moulding body the former is transferred to the counter-mould.

In order to prevent any damage and/or contamination of the preform during transport and/or storage, one example of embodiment envisages leaving the preform fixed to the moulding body and providing it with transport protection.

An inventive device for purposes of execution of an inventive method for the preparation of a dry textile preform for a large surface area component, in particular with a spherically curved surface, has a moulding body with a mould surface for purposes of accommodating at least one dry fibre entity, a tensioning frame for purposes of laying down the fibre entity on the mould surface, and a clamping device for purposes of fixing the at least one fibre entity to the moulding body.

In order to adjust precisely, and to be able to readjust, the tensile force for purposes of clamping the at least one fibre entity in the tensioning frame, the latter can have force/path-controlled clamping jaws. In particular it is possible by this means to even out precisely any differences in length of individual fibre entity sections, and thus to tension the fibre entity over the whole of its cross-section with a prescribed, preferably constant, tensile force.

Any warping of the laid down fibre entity during the fixing to the moulding body can, for example, be prevented in that the clamping device has a multiplicity of clamping jaws, which, as viewed in the peripheral direction, engage evenly with the fibre entity. Alternatively, the clamping device can also have a clamping ring that is closed and can be traversed in the peripheral direction.

For purposes of avoiding any damage to the preform during clamping it is advantageous if the moulding body has a body section facing away from the mould surface for purposes of engaging the clamping jaws. Moreover, the at least one fibre entity can by this means be pulled around an edge of the body bounding the mould surface, and can thereby be smoothed out.

In order to be able to lay down the vacuum foil in a secure location on the moulding body, in one example of embodiment a multiplicity of suction ports are provided in the mould surface for purposes of connection to a vacuum unit. By this means any gap between the mould surface and the vacuum foil can be evacuated, and thus the vacuum foil can be fixed securely and free of creases on the mould surface. In addition, recesses for the accommodation of at least one resin connecting pipe and at least one vacuum connecting pipe can be designed in the region of the mould surface on the moulding body.

In order to enable the laying down of a multiplicity of fibre entities with different orientations one example of embodiment has a rotary unit for purposes of executing a rotation of the moulding body relative to the tensioning frame. Needless to say, however, the tensioning frame of the fibre entities can also be mounted such that it can rotate, instead of the moulding body.

The lowering of the moulding body for purposes of transfer of the at least one fibre entity to the counter-mould, which is favourable in terms of production engineering and ergonomics, can, for example, be implemented in that the device has a pivoting unit for purposes of pivoting the moulding body about a horizontal axis.

The inventive method and the inventive device are suitable for, amongst other factors, in particular a spatial and timewise separation of the individual steps of the method, such as the manufacture and preparation of the fibre entity or fibre entities, manufacture of the preform, and also resin infiltration and curing of the preform. Moreover, large and expensive items of production equipment, such as the counter-mould of the moulding body, need only to be populated with a preform when this is also to be subjected to resin infiltration. In addition, the processing time for the manufacture of the preform and/or the cured component can be shortened, since, for example, the fibre entities can be prepared, and laid down on the moulding body one after another.

BRIEF DESCRIPTION OF THE DRAWINGS

In what follows preferred examples of embodiment of the invention are elucidated in more detail with the aid of very simplified schematic representations. Here.

DETAILED DESCRIPTION OF THE PREFERRED EMBODIMENTS

In the figures the same design elements have the same reference numbers, wherein where there is a plurality of the same design elements in one figure for reasons of clarity, just one element, or just some of the elements, is/are provided with the respective reference number.

Figure 1:
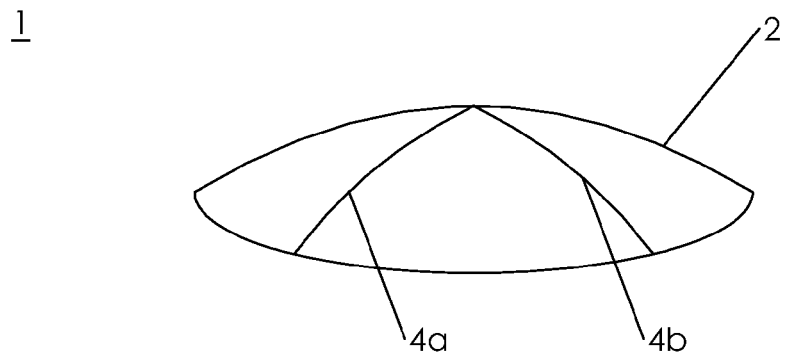
FIG. 1 shows a perspective representation of one component manufactured in accordance with an inventive method.

FIG. 1 shows a perspective representation of an inventive component 1 with a spherically curved surface 2, which is stiffened by means of reinforcing elements 4*a*, 4*b* extending in the radial direction. The component 1 is, for example, a fibre-reinforced composite-based pressure bulkhead of a civil aeroplane and is produced from a spherically shaped dry, i.e. resin-free, textile preform 6 corresponding to the component 1, shown in FIG. 2 in cross-section, by means of resin infiltration and an autoclave process.

Figure 2:
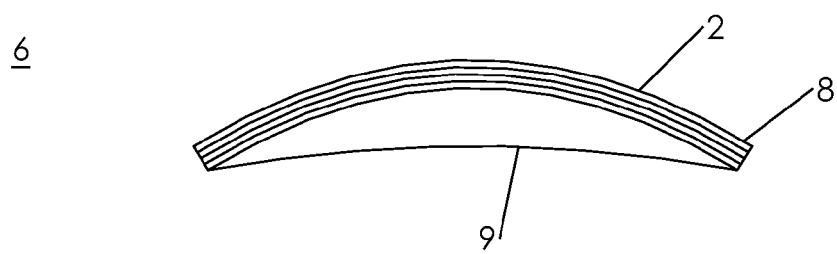
FIG. 2 shows a cross-section of a dry textile preform for the component in FIG. 1.
Figure 3:
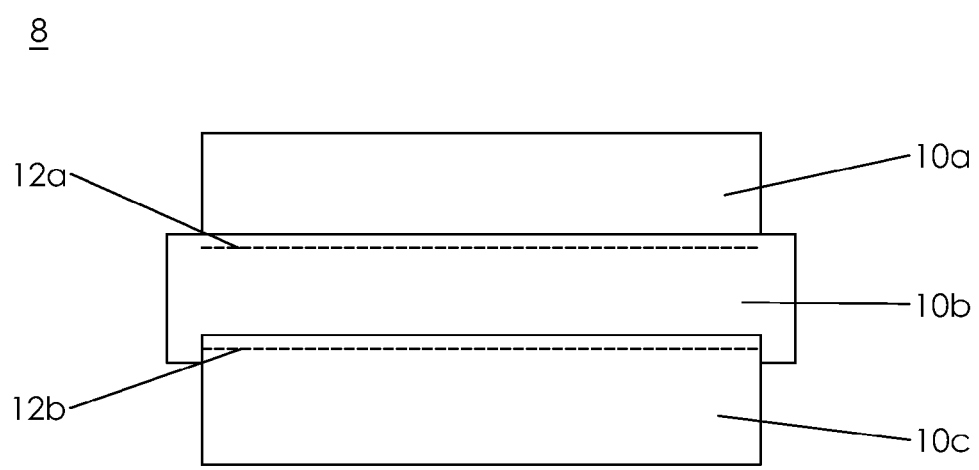
FIG. 3 shows a plan view onto a fibre entity of the preform in FIG. 2.

In accordance with FIG. 2 the preform has a multiplicity of fibre entities or fibre carpets 8 in the form of layers arranged one upon another, of which in the interests of clarity, only one fibre carpet 8 is numbered. Here in accordance with the representation an upper exterior fibre entity 8 defines the upper surface 2, and in accordance with the representation a lower exterior fibre entity 8 defines a lower surface 9 that is opposite to the upper surface 2. The fibre entities 8 are preferably designed as fibre weaves, but can also be fibre meshes, fibre fabrics, etc. In accordance with FIG. 3 they are in each case constituted from three semi-finished fibre products 10a, 10b, 10c in the form of strips, which in each case consist of a multiplicity of dry carbon fibres and in the region of their mutually overlapping longitudinal sides are connected with one another by means of a longitudinal seam 12a, 12b.

Figure 4:
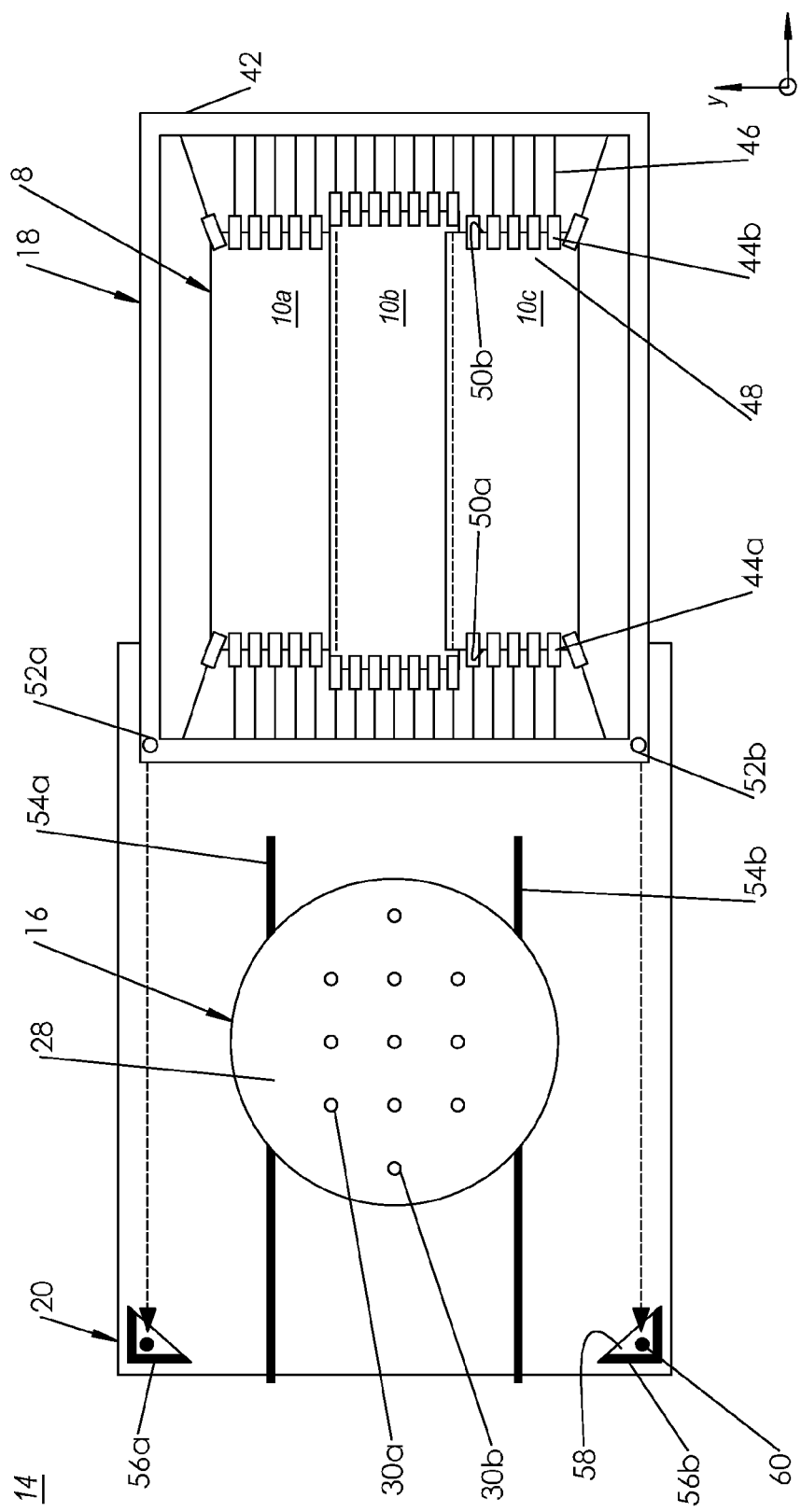
FIG. 4 shows a plan view of an inventive device.

FIG. 4 shows a plan view onto an inventive device 14 for the manufacture and preparation of the preform 6 for the component 1. The device 14 has a moulding body 16 for purposes of accommodating the fibre entities 8, a tensioning frame 18 for purposes of tensioning and laying down the fibre entities 8 on the moulding body 16, and a positioning unit 20 for purposes of positioning the tensioning frame 18 relative to the moulding body 16.

Figure 5:
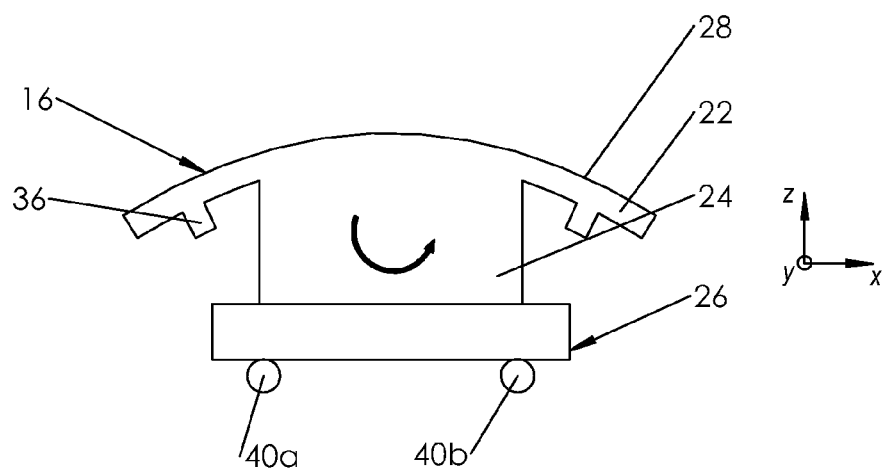
FIG. 5 shows a side view of a moulding body shown in FIG. 4, FIGS. 6, 7, 8 and 9 show steps in the method for the manufacture of the preform.

The moulding body 16 is designed as a positive mould, and in accordance with FIG. 5 has a mushroom-shaped body, with a head section 22 for purposes of accommodating the fibre entities 8, and a cylindrically-shaped foot section 24, via which it is supported on a trolley 26.

The head section 22 has a spherically shaped mould surface 28 corresponding to the lower surface 9 of the component 1, into which is introduced a pattern of holes with a multiplicity of suction ports 30a, 30b (see FIG. 4). The suction ports 30a, 30b serve to suck off a layer of air formed on the mould surface 28, and are actively connected with a vacuum unit, not shown. In addition to the suction ports 30a, 30b, a recess, not shown, is designed into the mould surface 28 in each case for purposes of accommodating a resin connecting pipe 32 and a vacuum connecting pipe 34, shown in FIGS. 12 and 13.

Figure 9:
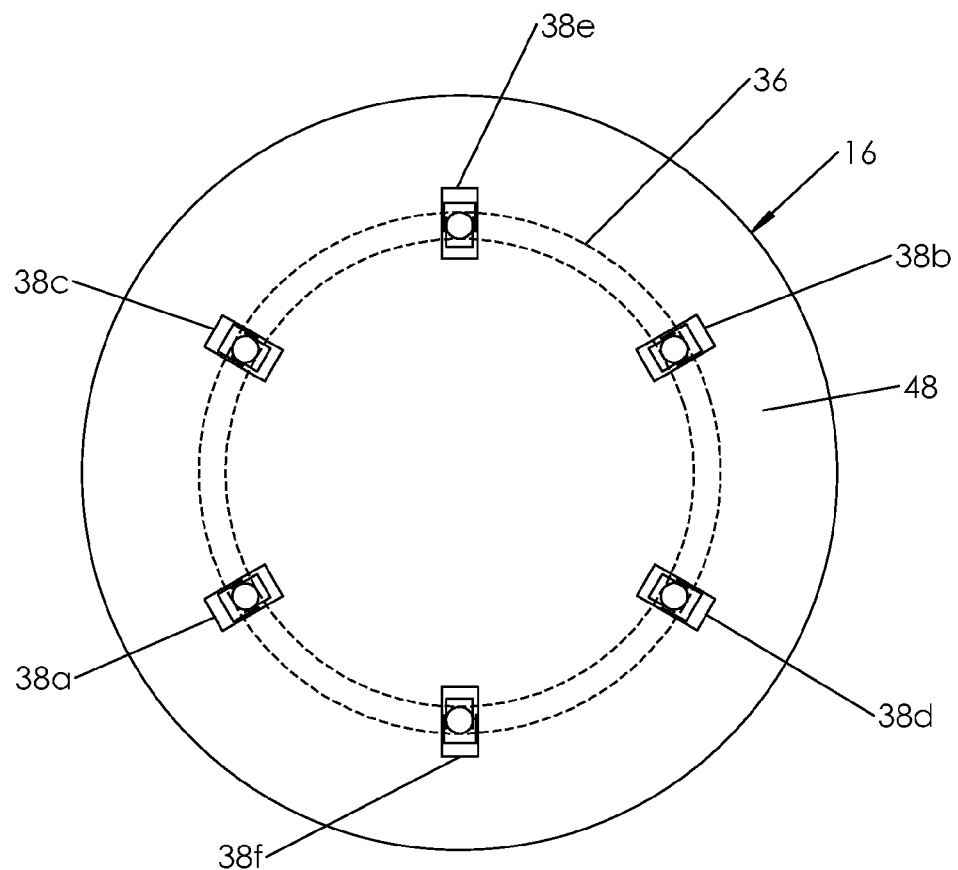

On an annular surface of the head section 22, facing away from the mould surface 28, a radial flange 36 is provided for purposes of accommodating a multiplicity of clamping jaws 38a to 38f, shown for example in FIG. 9, of a clamping unit, not represented in any further detail, of the device 14, for purposes of fixing the fibre entities 8 on the moulding body 16.

The trolley 26 has a multiplicity of wheels 40a, 40b for purposes of positioning the moulding body 16 in the device 14.

The tensioning frames 18, in accordance with FIG. 4, have in each case an approximately square frame 42 and a multiplicity of clamping jaws 44a, 44b, diametrically arranged in pairs in each case, for purposes of tensioning one fibre entity 8 in each case. The frame 42 defines a clamping plane lying in the plane of the drawing for purposes of accommodating the fibre entity 8, wherein for purposes of avoiding any rotation of the fibre entity 8 in the tensioned state the clamping jaws 44a, 44b lie in the clamping plane. The clamping jaws 44a,44b are connected to the frame 42 each case via a force/path-controlled spring suspension 46, and engage with the edge region 48 of the fibre entity 8, wherein for purposes of avoiding loading on the longitudinal seams 12a, 12b the clamping jaws 44a, 44b engage with the edge regions 48 of the narrow sides 50a, 50b of the semi-finished fibre products 10a, 10b, 10c and thus the semi-finished fibre products 10a, 10b, 10c, i.e. the fibre entity, is tensioned along its longitudinal axis. By virtue of the spring suspension 46 the semi-finished fibre products 10a, 10b, 10c as depicted can be designed with different lengths, since the length difference is compensated for by the spring suspensions 46, and this does not have any disadvantageous effect on a defined and constant tensile force. In particular the clamping jaws 44a, 44b can be activated individually via the spring suspensions 46, such that the semi-finished fibre products 10a, 10b, 10c can be locally acted upon with different tensile forces, so that the semi-finished fibre products 10a, 10b, 10c can be aligned in the tensioning frame 18 and both component and mounting tolerances can be compensated.

For purposes of positioning the tensioning frame 18 in the device 14 they have in each of at least two corner regions a mechanical positioning means 52a, 52b, not described in any further detail.

The positioning unit 20 has two rails 54a, 54b, along which the trolley 26 and thus the moulding body 16 can be traversed. For purposes of accommodating the tensioning frame 18 the positioning unit 20 has two vertical struts 56a, 56b, which in each case have a bracket 58 that can be traversed in the vertical direction z with a centring means 60, not described in any further detail, for purposes of accommodating the positioning means 52a, 52b of the tensioning frame 18. The positioning means 52a, 52b are, for example, pegs, and the centring means 60 are holes for purposes of accommodating the pegs.

In addition, the device 14 has a rotary unit, not shown, for purposes of rotating the mounting body 16 about its vertical axis extending in the vertical direction.

In what follows a preferred example of embodiment of the inventive method is elucidated:

The fibre entities 8 are manufactured from the semi-finished fibre products 10a, 10b, 10c in an appropriate number by the formation of the longitudinal seams 12a, 12b and in each case, as shown in FIG. 4, are tensioned in a tensioning frame 18 in the longitudinal direction. Fibre entities 8 not required for the immediate preform structure are in each case clamped in the tensioning frame, packed and temporarily stored. Subsequently a tensioning frame 18 populated with a fibre entity 8 is arranged in the device 14 on the brackets 58 of the vertical struts 56a, 56b. The moulding body 16 is placed on a trolley 26 and arranged in the device 14 in a design position relative to the tensioning frame 18.

Figure 6:
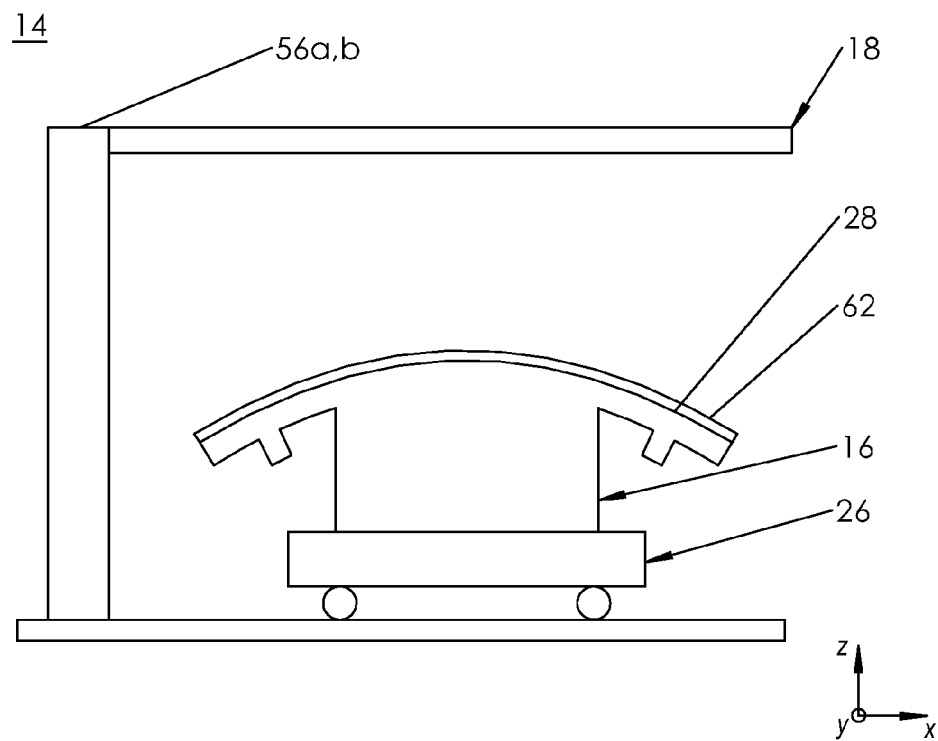
Figure 12:
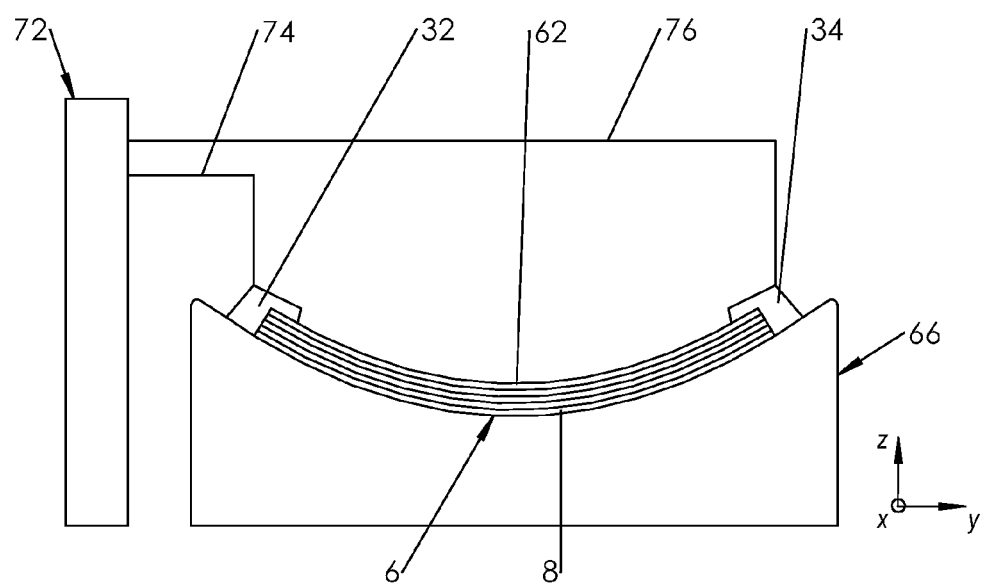
FIG. 12 shows a resin infiltration of the preform.
Figure 13:
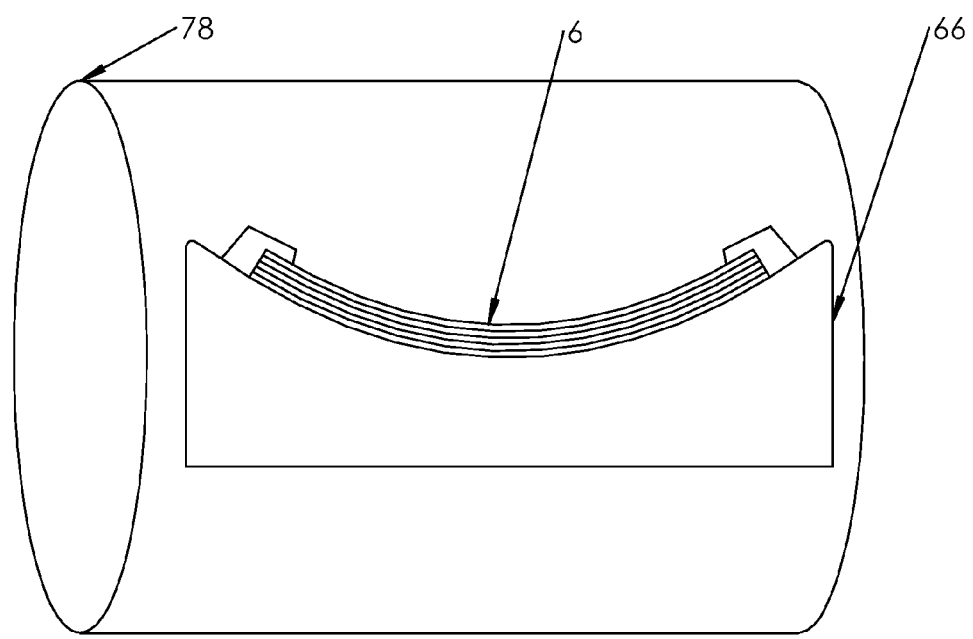
FIG. 13 shows an autoclave process.

Next, as shown in FIG. 6, a vacuum foil 62 is laid down on the mould surface 28 of the moulding body 16 for a resin infiltration of the preform 6, shown in FIG. 12, and by a sucking off of the layer of air located between the mould surface 28 and the vacuum foil 62 by means of the vacuum unit, not shown, is fixed in a position on the mould surface 28 that is free of creases and folds. Next the at least one resin connecting pipe 32 and the at least one vacuum connecting pipe 34, shown in FIGS. 12 and 13, are integrated into the vacuum foil 62.

Figure 7:
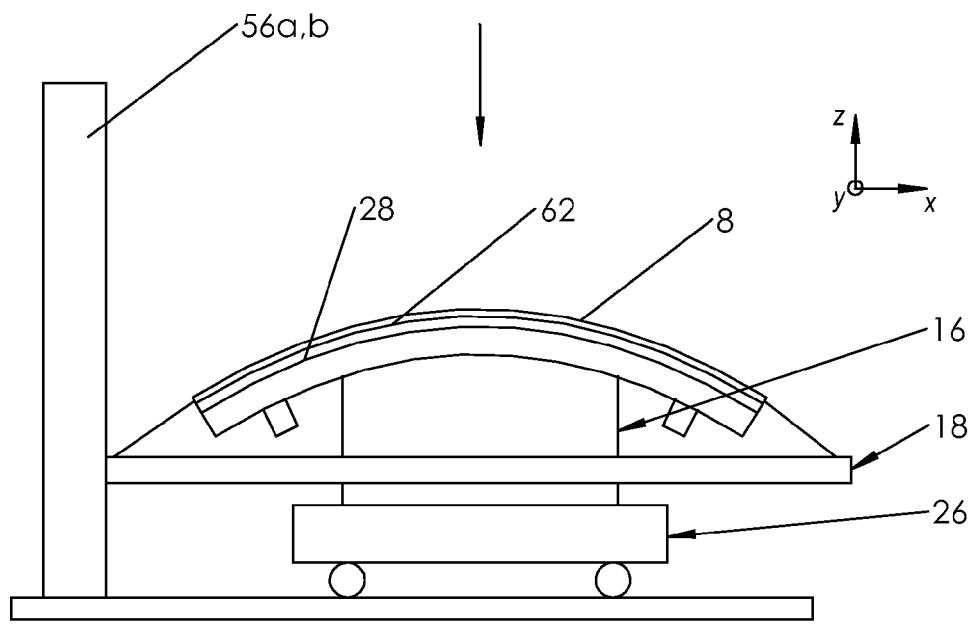
Figure 8:
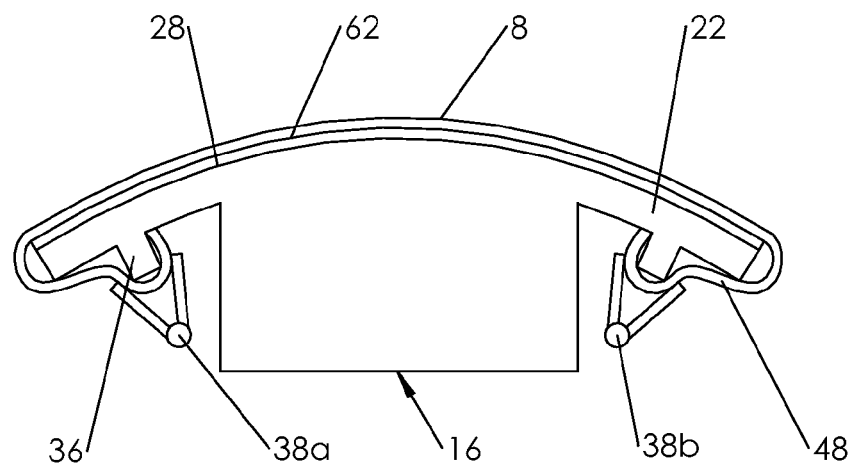

Then in accordance with FIG. 7 the tensioning frame 18 is lowered in the vertical direction towards the moulding body 16 in accordance with the arrow and the fibre entity 8 is laid down on the vacuum foil 62. Next the edge region 48 of the fibre entity 8 is guided around the head section 22 of the moulding body 16 and, as shown in FIGS. 8 and 9, is fixed to the radial flange 36 by means of the clamping jaws 38a to 38f of the clamping unit, wherein in each case a clamping force is set corresponding to the tensile force of the tensioning frame 18. For an even loading of the fibre entity 8 the clamping jaws 38a to 38f are evenly distributed over the periphery of the fibre carpet 6.

After the clamping of the laid-down fibre lay 6, the free tensioning frame 18 is removed, the moulding body 16 is rotated about its vertical axis by a particular angle, and in the device 14 a next tendering frame 18 is brought into position on the brackets 58 of the vertical struts 56a, 56b for purposes of laying down a further fibre entity 8. The fibre entity 8 is once again laid down by a lowering of the tensioning frame 18 on the previous fibre entity 8 and fixed by means of the clamping jaws 38a to 38f to the moulding body 16. The clamping of the fibre entities 8 takes place uniformly by means of the clamping jaws 38a to 38f, which are opened and closed in accordance with the fixing of the fibre entity that has just been laid down. The steps of the method: arrangement of the tensioning frame 18 in the device 14, lowering of the tensioning frame 18, laying down of the fibre entity 8, opening of the clamping unit, and fixing of the fibre entity 8 on the moulding body 16, are repeated until the preform 6 has the required number of material layers or fibre entities 8.

Figure 10:
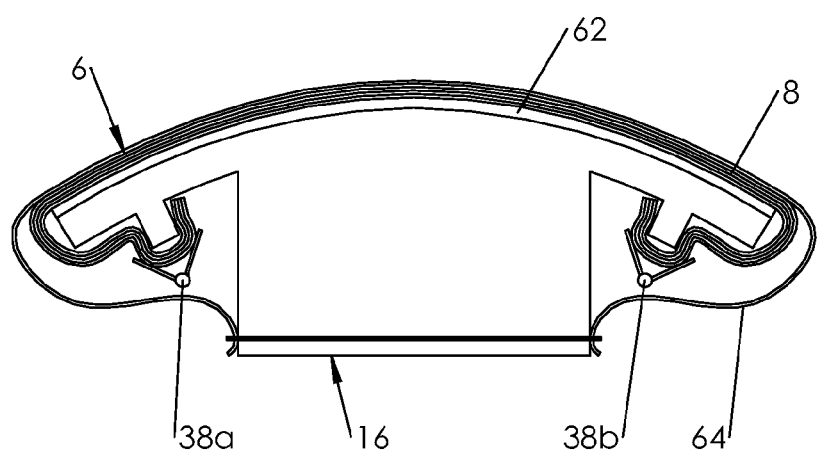
FIG. 10 shows the intermediately stored preform secured for transport.

After the last fibre entity 8 has been laid down, as shown in FIG. 10, for purposes of avoiding any damage to the preform 6 during storage or transport, the preform 6 is provided with a protective cover 64 on the mounting body 16 in the clamped state by means of the clamping jaws 38a to 38f. After the arrangement of the protective cover 64 the moulding body 16, populated with the clamped preform 6, is taken out of the trolley 26 and temporarily stored until it is arranged in a pivoting unit 68 for purposes of transferring the preform 6 to a counter-mould 66, as sketched in FIG. 11, for purposes of preparation for the resin infiltration.

The counter-mould 66 is designed as a negative mould and has a spherically curved mould surface 70 corresponding to the surface 2 of the component 1.

Figure 11:
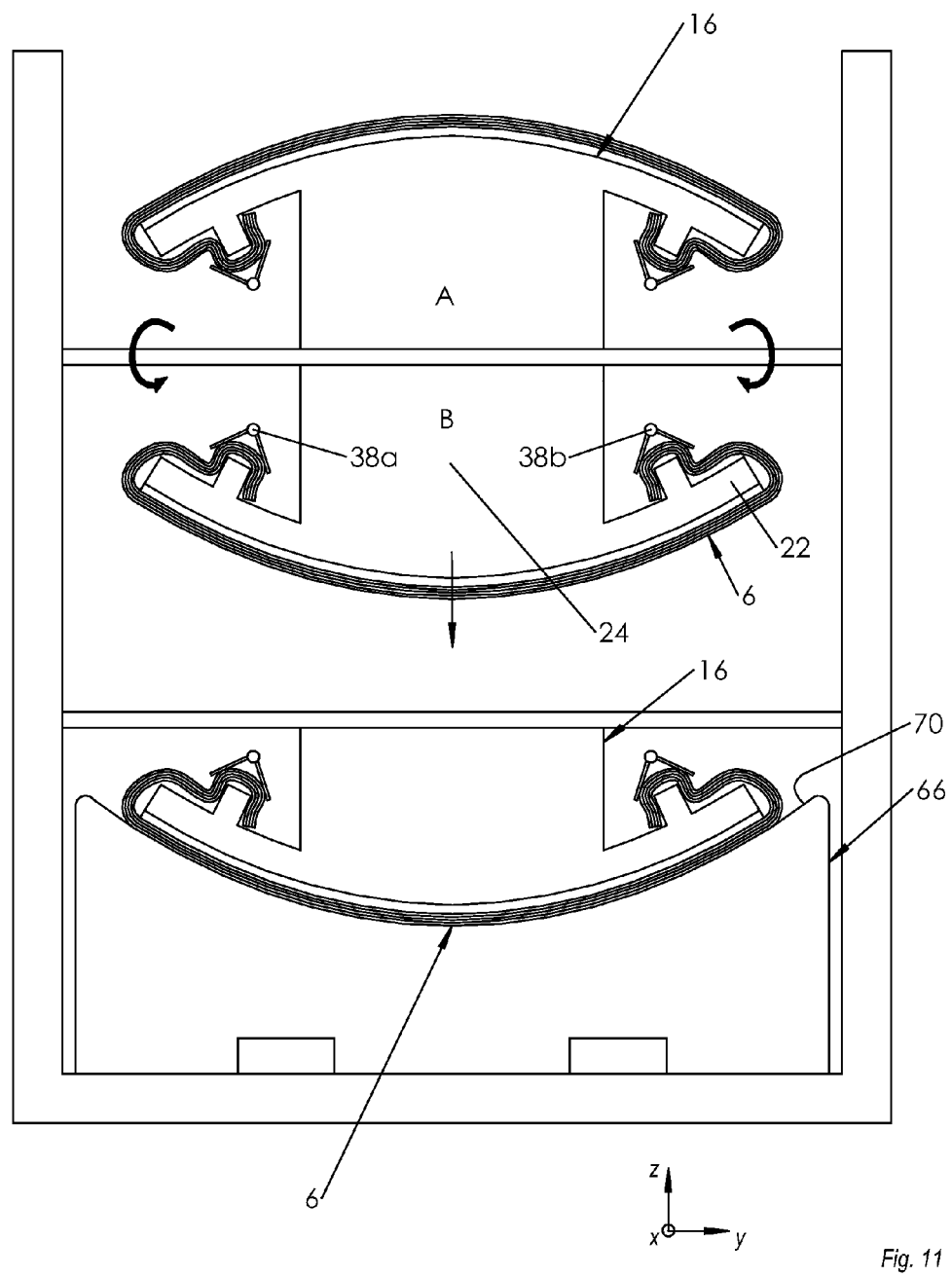
FIG. 11 shows a pivoting unit and a method step for the transfer of the preform to a counter-mould of the moulding body.

For purposes of transfer of the preform 6 to the counter-mould 66, the protective cover 64 is removed, and the moulding body 16 is transferred by means of the pivoting unit 68, not described in any further detail and indicated in FIG. 11, for example, a turn-over device, about its horizontal axis from its vertical position A into a inverted position B, in which the head section 22 and thus the preform 6 is positioned underneath the foot section 24. The fixing of the preform 6 to the moulding body 16, to prevent it from falling down, is performed exclusively by means of the clamping unit, i.e. the clamping jaws 38a to 38f.

The moulding body 16 is lowered towards the counter-mould 66 in the direction of the arrow and the preform 6 is laid down onto the mould surface 70. After the preform 6 has been laid down onto the mould surface 70 the clamping unit is released and the preform 6 is transferred to the counter-mould 66.

Then, as shown in FIG. 12, the counter-mould 66, populated with the preform 6, is arranged in the region of a resin infiltration unit 72 for purposes of resin infiltration, for example, with an epoxy resin. As a result of the pivoting of the preform 6 about its horizontal axis, the vacuum foil 62 is now arranged above the fibre entities 8, as a result of which the latter are already packed in a quasi vacuum-tight manner. The at least one resin connecting pipe 32 and the at least one vacuum connecting pipe 34, which are already integrated into the vacuum foil 62, are connected with a resin line 74 and with a vacuum line 76 respectively. The resin infiltration unit 72 is appropriately activated and the resin infiltration of the preform 6 is executed.

After the resin infiltration, the counter-mould 66, for purposes of curing the preform 6 that has been impregnated with resin, is positioned as shown in FIG. 13 for the execution of a curing process, i.e. an autoclave process, in an autoclave 78. In the autoclave 78 the preform 6, is cured with the application of pressure and temperature to form the carbon fibre-reinforced plastic-based composite component 1 shown in FIG. 1. After curing of the component 1 has been completed it is removed from the mould, and finishing processes, in particular for processing the component 1 to its design dimensions, are executed.

The stiffening elements 4a, 4b preferably consist of carbon fibre-reinforced material strips, such as pre-pregs, which have been pre-impregnated with a resin, and are preferably positioned between the fibre entities 8.

Disclosed is a method for the preparation of a dry textile preform for a large surface area fibre-reinforced composite component, in which resin-free textile material layers for purposes of manufacturing the preform are tensioned in each case in a tensioning frame, and in the stretched state are laid down on a moulding body by means of a linear relative movement between the tensioning frame and the moulding body; also disclosed is a device for the execution of a method of this type with a tensioning frame for purposes of tensioning the material layers, and with a clamping unit for purposes of fixing the laid-down material layers on a moulding body.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

REFERENCE SYMBOL LIST:

1 Component
2 Surface
4a, b Reinforcement element
6 Preform
8 Fibre entity
9 Lower surface
10a, b, c Semi-finished fibre product
12a, b Longitudinal seam
14 Device
16 Moulding body
18 Tensioning frame
20 Positioning unit
22 Head section
24 Foot section
26 Trolley
28 Mould surface
30a, b Suction port
32 Resin connecting pipe
34 Vacuum connecting pipe
36 Radial flange
38a, b, c, d, e, f Clamping jaw
40a, b Wheels
42 Frame
44a, b Clamping jaw
46 Spring suspension
48 Edge region
50a, b Narrow sides
52a, b Positioning means
54a, b Rail
56a, b Vertical strut
58 Bracket
60 Centring means
62 Vacuum foil
64 Protective cover
66 Counter-mould
68 Pivoting unit
70 Mould surface
72 Resin infiltration unit
74 Resin line
76 Vacuum line
78 Autoclave A Upright position
B Inverted position

The invention claimed is:

1. A device for the preparation of a dry textile preform for a large surface area component comprising:
- a moulding body with a mould surface for purposes of accommodating at least one dry fibre entity,
- a tensioning frame for purposes of laying down the at least one fibre entity on the mould surface, wherein the tensioning frame is adapted for tensioning the at least one fibre entity with a defined tensile force at a distance from the moulding body, for positioning the at least one fibre entity relative to the moulding body and for laying down the fibre entity on the moulding body and
- a clamping unit for purposes of fixing the at least one fibre entity on the moulding body,
- wherein a multiplicity of suction ports are designed in the mould surface for purposes of connecting to a vacuum unit, as are recesses for purposes of accommodating at least one resin connecting pipe and at least one vacuum connecting pipe.

2. The device in accordance with claim 1, wherein the large surface area component has a spherically curved surface.

3. The device in accordance with claim 1, wherein the tensioning frame has diametrically arranged force/path-controlled clamping jaws, wherein the clamping jaws are each connected to the tensioning frame via one force/path-controlled spring suspension.

4. The device in accordance with claim 3, wherein the clamping unit has a multiplicity of clamping jaws.

5. The device in accordance with claim 3, wherein the moulding body has a body section facing away from the mould surface with which the clamping jaws of the clamping unit can engage.

6. The device in accordance with claims 1, wherein a rotary unit is provided for purposes of rotating the moulding body relative to the tensioning frame.

7. The device in accordance with claim 1, wherein a pivoting unit is provided for purposes of pivoting the moulding body for purposes of laying down the preform in a countermould.

8. A device for the preparation of a dry textile preform for a large surface area component comprising:
- a moulding body with a mould surface for purposes of accommodating a plurality of dry fibre entities,
- a tensioning frame for purposes of laying down the at least one fibre entity on the mould surface, wherein the tensioning frame is adapted for tensioning the at least one fibre entity with a defined tensile force at a distance from the moulding body, for positioning the at least one fibre entity relative to the moulding body and for laying down the fibre entity on the moulding body,
- a clamping device for purposes of fixing the at least one fibre entity on the moulding body, and
- a rotary unit for rotating the moulding body relative to the tensioning frame between the laying down of successive fibre entities,
- wherein a multiplicity of suction ports are designed in the mould surface for purposes of connecting to a vacuum unit, as are recesses for purposes of accommodating at least one resin connecting pipe and at least one vacuum connecting pipe.

* * * * *